3,054,219
SEED INOCULATION

Frederic E. Porter and Vernon W. McAlpine, Columbus, Ohio, and Howard E. Kaerwer, Jr., Hopkins, Minn.; said Porter and McAlpine assignors to Battelle Memorial Institute, Columbus, Ohio, a corporation of Ohio
No Drawing. Filed Feb. 20, 1959, Ser. No. 794,540
18 Claims. (Cl. 47—1)

This invention relates to plants, having a beneficial microorganism infection, obtained by inoculating plant seeds, and, more especially legumes, with large numbers of viable microorganisms. More particularly, the invention relates to inoculated seeds having a sufficient viable microorganism population to produce a desirable, beneficial infection of the plants growing therefrom after storage of the inoculated seeds for several months.

Seed companies, prior to merchandising seeds, generally subject the seeds to a series of processes during which the seeds are cleaned, blended, dried, and otherwise upgraded. Farmers or planters, shortly prior to planting seeds, frequently inoculate such seeds with beneficial, viable microorganisms for improving the plants growing from the seeds. For example, nitrogen-fixing bacteria may be incorporated with seeds of legumes in order that the resulting plants may be less dependent upon soil nitrates for growth. Nitrogen fixation takes place in nodules formed by the plants in response to stimulation of the roots by the nitrogen-fixing bacteria. Because such nodules form as a result of an infective process, factors that promote the bacterial infection also promote nodule formation. As in any infection, a minimum number of bacteria is required to assure a beneficial infection. In order that all plants become infected, it is necessary that each inoculated seed incorporate this minimum level of bacteria, which may well be the amount required by the most resistant plant of the group.

There are many present-day methods of inoculating seeds with microorganisms, but essentially these techniques consist of intimately mixing the seeds with a microorganism-laden fluid or dust to coat the seeds. One existing method involves applying a culture of bacteria of the genus Rhizobium spp. to a carrier, such as peat and/or charcoal, mixing the resulting product with water and/or syrup, and then applying the resulting dispersion to the seeds. Other methods involve applying cultures in a fluid form containing no carrier solid by such means as spraying, immersion, and the like. Inoculated seeds from such treatments must be dried to permit their passage through drills and other planting equipment, but also must retain sufficient moisture to permit survival of the bacteria.

While the amount of microorganism inoculation may vary somewhat, depending to a large extent on the particular microorganism and particular seed, customarily there is employed the minimum infective dose of organisms per seed that is required to produce the beneficial infection. The minimum infective dose is defined as the smallest number of microorganisms that will produce an infection in each and every host plant. This minimum infective dose for Rhizobium spp. in legumes is a population of 100 to 1000 viable, infective and effective bacteria per seed. This level of inoculation approximates that supplied by commercial inocula for the present-day application of Rhizobium spp. to legume seeds.

A principal disadvantage of present practice is that the inoculated seeds must be planted immediately after treatment if satisfactory results are to be obtained. Existing methods require that seeds be inoculated on the farm or that seeds be taken to a nearby elevator for treatment. Once the seeds are inoculated they must be planted promptly. Recommendations vary, but about 24 hours are generally considered the maximum allowable interval between seed inoculation and planting. Seeds not planted within these 24 hours should be reinoculated, because some bacteria will have died within this time limit and the number of survivors may be insufficient to produce infection. Since planting is depedent upon an often uncontrollable, unpredictable factor of weather, it may not always be possible to plant inoculated seeds within the prescribed time. Reinoculation then is necessary before subsequent planting to permit the obtaining of the desired infection.

In general, existing methods require time and labor of the farmer or planter that could well be devoted to other tasks. Furthermore, inoculation must be properly performed or poor results will be obtained. It is estimated that only 10 percent of the alfalfa planted is inoculated, although inoculation of alfalfa seed is recommended strongly by agricultural authorities.

To overcome the foregoing and other disadvantages, attempts have been made in the past to develop inoculation treatments that would provide inoculated seeds having viable microorganisms capable of producing a beneficial infection of the plants growing therefrom after storage of the seeds for various periods after inoculation. These attempts sought to produce inoculated seed products wherein the microorganisms were incorporated or embodied with the seeds themselves in a manner permitting survival of the organisms during storage, or wherein auxiliary materials conducive to the protection and sustenance of the organisms were applied to the seeds. Prior to recent discoveries by the applicants, no commercial treatments were known and no commercially inoculated seeds were available that would permit a delay in planting greater than a few days after inoculation without substantial loss of beneficial infection.

An inoculation of seeds to produce an inoculated seed product having sufficient viable microorganisms to produce a desirable beneficial infection of plants growing therefrom would afford many advantages over present practice, if the seed could be inoculated at central locations, shipped, stored, and merchandised several months or more before planting takes place. Seed could be inoculated more effectively, in larger quantities, with greater uniformity, and at lower cost at central locations, such as seed company plants, than at locations near the planting, such as the farm. All seeds could be inoculated so that better agricultural practices would follow. Planting would be accelerated with inoculated, storable seeds since the farmer or planter would not have to spend time and effort in inoculation.

The present invention permits inoculation of plant seeds well in advance of planting. In fact, inoculum may be applied to the seeds and the inoculated seeds stored, shipped, and merchandised many months prior to planting. In accordance with the invention, applied, viable inoculum persists on the seeds during storage for extended periods so that such seeds are capable of giving rise to nodulated plants after periods of storage as long as 6 months or more. Storage and handling of the inoculated seeds of the invention may be in the manner customary and conventional for handling noninoculated seeds. Storage in permeable envelopes under room conditions has been found to be satisfactory.

It is generally known and recognized that micro-organisms do not survive under adverse storage conditions unless the organisms form a spore or other resistant form. Rhizobia generally are believed to exist only in a vegetative form which is not resistant to the effects of drying and heat. The mycorrhizial organisms, such as members of the order Hymenomycetes (Boletus or Amanita spp.), form a spore but these spores are not resistant to adverse conditions to the same extent as the classical endospore of *Bacillus subtilis*. Generally microorganisms that benefit plants directly are considered to be susceptible to the adverse conditions presently encountered during commercial seed storage.

This invention is concerned with viable microorganisms that benefit a plant directly by giving rise to a desirable, beneficial infection in the host plant. Included within these suitable viable microorganisms are bacteria, fungi and viruses. Suitable bacteria include members of the genus Rhizobium, such as *R. trifolii, R. japonicum, R. meliloti, R. leguminosarum, R. phaseoli, R. lupini* and others. Suitable fungi include Boletus spp. Amanita spp. and Rhizophagus spp. and others. Viruses include those that produce infection resistance in plants to important plant diseases such as Southern Bean mosaic, tobacco mosaic, aster yellows and others. Other viable microorganisms that benefit a plant directly by giving rise to a desirable, beneficial infection in the host plant will be apparent to those skilled in the art and also are suitable.

It has been found, if seeds inoculated with viable microorganisms (e.g. bacteria) are stored under conventional, commercial seed-storage conditions, that the number of surviving organisms is a function of the elapsed time and the original number of organisms. For Rhizobium spp. a plot of the number of surviving bacteria as a function of time presents a logarithmic decay curve. The rate of death of the bacteria is independent of the original number of organisms with the number of surviving bacteria being dependent upon the time elapsed and the number of viable bacteria originally present. Thus, by inoculation with a large enough number of microorganisms there may be obtained a remaining, desired minimum infective dose of a particular viable organism after a desired, extended period of storage. Such a discovery may account for the unexpected and superior inoculated seeds of the invention, which are capable of producing a beneficial infection in the plants growing therefrom after storage of the inoculated seeds for several months.

It has been found that treatment of seeds with beneficial, viable microorganisms in an amount to produce inoculated seeds having organism populations greater than about 10 times the minimum infective dose will provide storable, inoculated seeds that will give rise to a beneficial infection of the plants growing therefrom after storage of the inoculated seeds for several months. Organism populations of the invention may range from 10 to 10,000 or more time the minimum infective dose per seed. For Rhizobium spp. the organism population of the invention must be at least about 8,000 bacteria per seed. Desirably and preferably the inoculated seeds have populations of 100,000 to 1,000,000 or more organisms per seed with such inoculated seeds capable of storage for 6 months or longer. Where storage for only a few months is desired, populations less than 100,000 organisms per seed may be used. For example, original Rhizobium populations of 10,000 viable bacteria per seed persist in an amount to provide a beneficial infection during the first three months after storage. Organism populations per seed of 1,000,000 or more provide a beneficial infection after storage for periods of about one year. For most present-day merchandizing purposes there is no advantage in employment of organism populations in excess of 1,000,000 per seed, unless it is desired to hold over the inoculated seed from one planting season to another planting season.

In accordance with the invention, microorganisms are grown or obtained in any convenient manner or from any conventional source with existing recognized precedures and sources being suitable. Inoculum comprising the whole culture broth is suitable. Inoculum may be applied in the usual manner by conventional means with provision to inoculate the seeds with the requisite number of microorganisms of the invention per seed. Conventional slurry treatments, spray treatments, immersion treatment, and the like are suitable. The particular method of treatment is not critical so long as each seed receives the requisite organism population of the invention and so long as detrimental materials are not added. Desirably the treatment employs a small or minimum amount of liquid or water to avoid the necessity of prolonged drying and cost of removal of the liquid or water along with possible destruction of some organisms. Selection of a particular inoculation treatment may readily be made from among known procedures with due consideration of the particular seed, microorganism, quantities treated, cost, and the like. Obviously, some treatments will be less costly than others and these will be preferred. If desired, the inoculation may be made a portion of the conventional seed processing by the seed companies to provide a highly desirable product for merchandizing purposes.

In the treatment of various plant seeds, the amount of inoculum used is dependent on the concentration of the inoculum and the number of seeds. When employing small seeds of which a large number constitute a pound of seed, a larger number of microorganisms must be employed per pound of seed by using a larger amount of inoculum or a more highly concentrated inoculum than when employing large seeds of which a small number constitute a pound of seed.

Inoculation of seeds with auxiliary or extraneous beneficial materials in addition to the requisite microorganism populations of the invention is not necessary to provide the benefits and advantages of the invention. However, known beneficial materials may be employed in addition to the microorganism populations of the invention and such are within the scope of the invention. Such materials as known surface tension depressants for inoculum slurries and various known beneficial materials (e.g. oganic nitrogen sources, brewer's yeast, asparagine, etc.) that promote survival or growth may be used. Materials recognized as detrimental or destructive to viable microorganisms should be avoided and not included.

The following examples are given to present specific embodiments and illustrations of the invention, and are not to be interpreted as limiting thereof, other than as set forth in the claims.

EXAMPLE A.—PREPARATION OF BACTERIAL SLURRIES

Bacteria of the genus Rhizobium spp. were grown on yeast mannitol agar. The rhizobia whole cultures were harvested by washing the growth off the agar with water. Water was then added to the washings containing the whole culture to make up a slurry of desired concentration. The concentration of the slurry may vary greatly without impairment of the advantages of the invention. Slurries ranging from approximately $27 \times 10^2$ bacteria per milliliter to slurries containing approximately $20 \times 10^9$ bacteria per milliliter have been prepared and used successfully. Slurry culture counts were determined by preparing decimal dilutions of the slurry and transferring 0.1 ml. aliquots of each dilution to a separate yeast mannitol agar plate. The aliquots were streaked over the agar surfaces with a sterile glass rod. Colonies on the plates were counted after an incubation period of about 4 days at a temperature approximating 70° F.

EXAMPLE B.—SEED INOCULATION

Seed lots, ranging from 4.5 grams to 800 grams of alfalfa seed of which about 220,000 seeds constitute one pound of seed, were inoculated to obtain lots of seeds having bacteria populations from 500 to 1,600,000 bacteria per seed immediately after inoculation. Each lot of seed was sprayed with a slurry of rhizobia, produced as described in Example A. The sprayed seeds were thoroughly mixed and then the whole mass spread in a thin layer in the atmosphere and permitted to air dry (generally overnight). Inoculum slurries having bacteria concentrations of $27 \times 10^5$ bacteria per milliliter, $4 \times 10^8$ bacteria per milliliter, were employed in the amounts necessary based on the size of the particular lot of seeds.

EXAMPLE C.—STORAGE

The lots of inoculated alfalfa seeds, after preparation as described in Example B, were placed in permeable, paper envelopes and stored. Storage was in an enclosed, roofed building in the temperate climate. During storage no attempt was made to control the environmental humidity which ranged from about 20% to 95% relative humidity during storage, depending to a large extent on the weather and season of the year. Temperature during storage during the cooler months was maintained at 70±5° F. and in the warmer months ranged as high as 95° F.

Control lots of the same alfalfa seeds, as employed in Example B, were thoroughly washed with a bactericidal aqueous solution of about 0.5 percent sodium hypochlorite by weight and then air dried. This treatment was for the purpose of killing incidental bacteria, which may have existed on the surface of the seed. These lots of alfalfa seed, as control lots, also were placed in permeable, paper envelopes and stored in the same manner as the stored lots of inoculated alfalfa seeds.

Additional lots of the same alfalfa seeds, as employed in Example B, no preliminary treatment prior to storage, were employed as additional control lots. These lots also were placed in permeable, paper envelopes and stored in the same manner as the stored lots of inoculated alfala seeds.

EXAMPLE D.—PLANTING

Planting tests were conducted on samples of each of the lots of seeds, stored as described in Example C, after various intervals of storage. Fifteen seeds were selected at random for each planting from each of the lots and planted in a nitrogen-deficient growing medium. The nitrogen-deficient growing mediums consisted of a quart jar of vermiculite to which 100 cc. of a solution of suitable plant nutrients was added. The solution of plant nutrients consisted of 0.5 cc. of 1 molar KCl; 0.2 cc. of 0.1 molar $MgSO_4$—$7H_2O$; 0.2 cc. of 0.25 molar $Ca(H_2PO_4)_2 \cdot H_2O$; 8.0 cc. of 0.5 molar $CaSO_4$; 0.05 cc. of 0.5 percent Fe in the form of a chelate of ethylenediamine tetraacetic acid; 0.05 cc. of a solution of trace elements; and 91 cc. of deionized water. The pH of the autoclaved growing medium was buffered to about a pH of 7 by the use of phosphate buffer. This medium was autoclaved. The seeds were then placed aseptically in the growing medium. From 80 to 95% of the seeds in each sample of 15 seeds germinated. After germination, each sample was thinned to 10 plants. Four to six weeks after germination the plants from each seed sample were inspected with their roots examined for the formation of nodules. The presence of nodules on roots was taken as indicative of rhizobia infection and of the presence of viable rhizobia on the inoculated, stored, planted seed.

Each result tabulated in the following Table I is an average of 3 to 4 plantings. The results are the percent of the plants, after thinning, which exhibited nodules on their roots four to six weeks after germination. For comparison purposes, the results of plantings of the control lots of seeds and lots of conventionally inoculated seeds are tabulated along with the results of plantings of the lots of inoculated, storable seeds of the invention.

*Table I*

| Bacteria Population bacteria/seed | Nodulated Plants Obtained (percent) | | | | | | | | |
|---|---|---|---|---|---|---|---|---|---|
| | Planted Immediately | Planted after Storage for Period Shown in Days | | | | | | | |
| | | 80 | 110 to 125 | 160 to 175 | 200 | 245 | 270 | 315 | 355 |
| 0 a | 0 | 0 | 0 | 0 | 0 | 0 | 0 | 0 | 0 |
| 0 b | 0 | 0 | 0 | 0 | 0 | 0 | 0 | 0 | 0 |
| 400 c | 100 | 0 | 0 | — | — | — | — | — | — |
| 8,000 to 10,000 | 100 | 100 | d 40 | 0 | — | — | — | — | — |
| 40,000 | — | 100 | 95 | 100 | 70 | — | 81 | — | d 31 |
| 80,000 | — | 100 | 80 | 100 | 45 | — | 77 | — | d 36 |
| 160,000 | — | 100 | 75 | 100 | 89 | — | 80 | — | d 32 |
| 240,000 | — | 100 | 80 | 100 | 72 | — | 76 | — | 67 |
| 400,000 | — | 110 | 97 | 71 | — | 86 | — | 50 | — |
| 800,000 | — | 100 | 100 | 76 | — | 100 | — | 85 | 76 |
| 1,600,000 | — | 100 | 100 | 80 | — | 100 | — | 80 | — |

CODE.—(—) No plantings.
a Control seeds, no seed treatment.
b Control seeds, surface sterilized.
c Inoculated seeds, representative of a conventional seed inoculation.
d The appearance of these plants indicated beneficial effects of inoculation were diminishing.
All other plants exhibited a normal healthy appearance.

The tabulated results illustrate beneficial infections in plants from the inoculated, storable seeds of the invention and a significant absence of beneficial infections in the control seeds and conventionally inoculated seeds after periods of storage greater than 3 months.

EXAMPLE E

Alfalfa seeds were inoculated in a continuous manner by a process comprising spraying a moving, agitated mass of the seeds with an aqueous inoculum containing about $4 \times 10^8$ Rhizobium spp. per milliliter. One percent by weight of the aqueous inoculum was employed per unit weight of the seeds to deposit bacteria populations of about 8,000 to 10,000 per seed. Following passage of the agitated mass of seeds under the spray of inoculum, the seeds were agitated to thoroughly mix the same and then air dried. Over 140,000 pounds of alfalfa seed were inoculated by this procedure. The inoculated seeds were stored in cloth bags under varying conditions of temperature and humidity as encountered in commercial seed storage. After 3 to 5 months of storage the seeds were removed from storage and planted. Plantings were made in soil by farmers and planters in the customary and conventional manner for planting alfalfa seed. These plantings produced plants, which were the equivalent of plants produced from seeds having the minimum infective dose of Rhizobium spp. per seed which were planted immediately after inoculation.

EXAMPLE F

Seeds of legumes and in particular peas, soybeans, birdsfoot trefoil, inoculated with Rhizobium spp. to incorporate bacteria populations in excess of 8,000 bacteria per seed, stored for several months, and planted, give rise to a desirable, beneficial infection of the plants growing from the inoculated seeds.

EXAMPLE G

Seeds of Scotch pine inoculated with an aqueous slurry of fungi of the order of Hymenomycetes to deposit a fungus or spore population in excess of 200,000 fungi per seed, stored for several months, and planted in the soil, give rise to a desirable, beneficial infection of the plants growing from the inoculated seeds.

While the preceding examples illustrate the invention with reference to several different seeds and microorganisms, other plant seeds and other microorganisms may be employed. Illustrative, but not inclusive, of suitable plant seeds are seeds of plants of the group Leguminosae, of the genus Pinus, of the genus Aster. Seeds of plants having such common names as soy beans, wisteria, astragalus, vetch, lupine, clover, alfalfa, Scotch pine, Norway pine, white pine, red pine, oak, petunia, tobacco, bean, aster, tomato, pea, and the like are suitable. Other plant seeds, as will be apparent to those skilled in the art, also will be suitable and are included within the scope of the invention.

It is to be understood that various changes, modifications, and embodiments will be obvious to those skilled in the art from the preceding description and examples. It is desired to include all such changes, modifications, and embodiments that fall within the true spirit and scope of the invention and to limit the invention only as set forth in the appended claims.

What is claimed is:

1. A storageable, inoculated, plant seed product consisting essentially of plant seeds and at least 8,000 beneficial, viable microorganisms per seed, said product characterized upon planting after storage by giving rise to a beneficial microorganism infection of plants growing therefrom.

2. The product of claim 1 having from 100,000 to 1,000,000 of said microorganisms per seed.

3. A storageable, inoculated, legume seed product consisting essentially of legume seeds and at least 8,000 beneficial, viable bacteria per seed, said product characterized upon planting after storage by giving rise to a beneficial bacterial infection of plants growing therefrom.

4. A storageable, inoculated, plant seed product consisting essentially of plant seeds and bacteria of Rhizobium spp. of from 100,000 to 1,000,000 of said bacteria per seed, said product characterized upon planting after storage of several months by giving rise to a beneficial formation of nodules on roots of plants growing therefrom.

5. The product of claim 4 in which the plant seed is alfalfa seed.

6. In the process of obtaining plants having a beneficial microorganism infection, the combination of steps of: contacting plant seeds with a slurry consisting essentially of a slurry liquid and beneficial infective viable microorganisms slurried therein to inoculate the plant seeds with more than ten times the minimum effective dose of the organisms; storing the inoculated seeds for several months; and planting the stored inoculated seeds to obtain said plants.

7. In the process of obtaining plants having a desirable beneficial formation of nodules on roots of the plant, the combination of steps of: contacting plant seeds with an aqueous slurry consisting essentially of water and bacteria of Rhizobium spp. slurried therein to inoculate the plant seeds with at least 8,000 of the bacteria per seed; storing the inoculated seeds for several months; and planting the stored inoculated seeds to obtain said plants.

8. The process of claim 7 in which alfalfa seeds are treated and are inoculated with from 100,000 to 1,000,000 of the bacteria per seed.

9. In the process of imparting a desirable beneficial microorganism infection to plants, the combination of steps of: treating seeds, wherefrom said plants germinate, with a liquid slurry consisting essentially of a slurry liquid and viable beneficial microorganisms slurried therein to inoculate the seeds with more than ten times the minimum effective dose of the microorganisms; and storing the seeds so treated for several months; whereby the seeds thus treated and stored give rise, upon planting, to a beneficial microorganism infection of the plant.

10. The process of claim 9 in which the seeds are inoculated with at least 8,000 of said microorganisms per seed.

11. The process of claim 10 in which the seeds of legumes are treated to inoculate with bacteria.

12. The process of claim 10 in which the seeds are inoculated with from 100,000 to 1,000,000 of said microorganisms per seed.

13. The process of claim 12 employing viable bacteria of Rhizobium spp. as the microorganisms.

14. The process of claim 13 in which alfalfa seeds are treated.

15. The process of imparting a desirable beneficial microorganism infection to plants, consisting solely of the combination of steps of: treating seeds, wherefrom said plants germinate, with a liquid slurry consisting essentially of a slurry liquid and viable beneficial microorganisms slurried therein to inoculate the seeds with more than ten times the minimum effective dose of the microorganisms, said slurry treatment employing the slurry liquid in an amount suitable to avoid adverse effects of prolonged exposure of seeds thereto; and storing the seeds so treated for several months, the conditions of said storage being substantially in the manner which is customary and conventional for the storage of noninoculated seeds; whereby the seeds, thus treated and stored, uniformly give rise, upon planting, to a beneficial microorganism infection of the plants and are capable of survival to the same extent as seeds subjected not to said treating step and only to said storing step.

16. In the process of imparting a desirable beneficial microorganism infection to plants, the combination of steps of: treating seeds, wherefrom said plants germinate, with a liquid slurry consisting essentially of a slurry liquid and viable beneficial microorganisms slurried therein to inoculate the seeds with from 100,000 to 1,000,000 of said microorganisms per seed, said slurry treatment employing the slurry liquid in an amount suitable to avoid adverse effects of prolonged exposure of seeds thereto; and storing the seeds so treated for several months; the conditions of said storage being substantially in the manner which is customary and conventional for the storage of noninoculated seeds; whereby the seeds, thus treated and stored, uniformly give rise, upon planting, to a beneficial microorganism infection of the plants, and are capable of survival to the same extent as seeds subjected not to said treating step and only to said storing step.

17. A storageable, inoculated, plant seed product consisting essentially of low-moisture, non-toxic plant seeds and at least 8,000 beneficial, viable microorganisms per seed, said product characterized, upon planting after storage in substantially the manner which is customary and conventional for the storage of non-inoculated seeds, by survival of the seeds to the same extent as non-inoculated seeds after said storage, and by uniformly giving rise to a beneficial microorganism infection of plants growing therefrom.

18. A storageable, inoculated, plant seed product consisting essentially of low-moisture, non-toxic plant seeds and bacteria of Rhizobium spp. of from 100,000 to 1,000,000 of said bacteria per seed, said product characterized, upon planting after storage of several months in substantially the manner which is customary and conventional for the storage of non-inoculated seeds, by survival of the seeds to the same extent as non-inoculated seeds after said storage, and by uniformly giving rise to a beneficial formation of nodules on roots of plants growing therefrom.

References Cited in the file of this patent

UNITED STATES PATENTS

| | | |
|---|---|---|
| 1,354,808 | Diller | Oct. 5, 1920 |
| 2,313,057 | Fischer | Mar. 9, 1943 |

FOREIGN PATENTS 521,850    Belgium _____ Aug. 14, 1953

OTHER REFERENCES

"Yearbook of Agriculture 1931," (U.S. Department of Agriculture), published by U.S. Govt. Printing Office (1931). Page 343 relied on.

Modern Farmers' Cyclopedia of Agriculture (Wilcox), published by Orange Judd (N.Y.), 1952. Only page 481 is relied on.

UNITED STATES PATENT OFFICE
CERTIFICATE OF CORRECTION

Patent No. 3,054,219                      September 18, 1962

Frederic E. Porter et al.

It is hereby certified that error appears in the above numbered patent requiring correction and that the said Letters Patent should read as corrected below.

In the grant, lines 3 and 4, for "; said Porter and McAlpine assignors to Battelle Memorial Institute, of Columbus, Ohio, a corporation of Ohio," read -- , assignors, by direct and mesne assignments, to Northrup, King and Company, of Minneapolis, Minnesota, a corporation of Minnesota, --; lines 13 and 14, for "Battelle Memorial Institute, its successors or assigns, and Howard E. Kaerwer, Jr., his heirs" read -- Northrup, King and Company, its successors --; in the heading to the printed specification, lines 4 to 6, for "; said Porter and McAlpine assignors to Battelle Memorial Institute, Columbus, Ohio, a corporation of Ohio" read --, assignors, by direct and mesne assignments, to Northrup, King and Company, Minneapolis, Minnesota, a corporation of Minnesota --.

Signed and sealed this 19th day of February 1963.

(SEAL)
Attest:

ESTON G. JOHNSON                      DAVID L. LADD
Attesting Officer                       Commissioner of
                                                              Patents